June 2, 1936. H. F. MERRIAM 2,043,202
METHOD FOR REDUCING SULPHUR DIOXIDE
Filed July 23, 1932
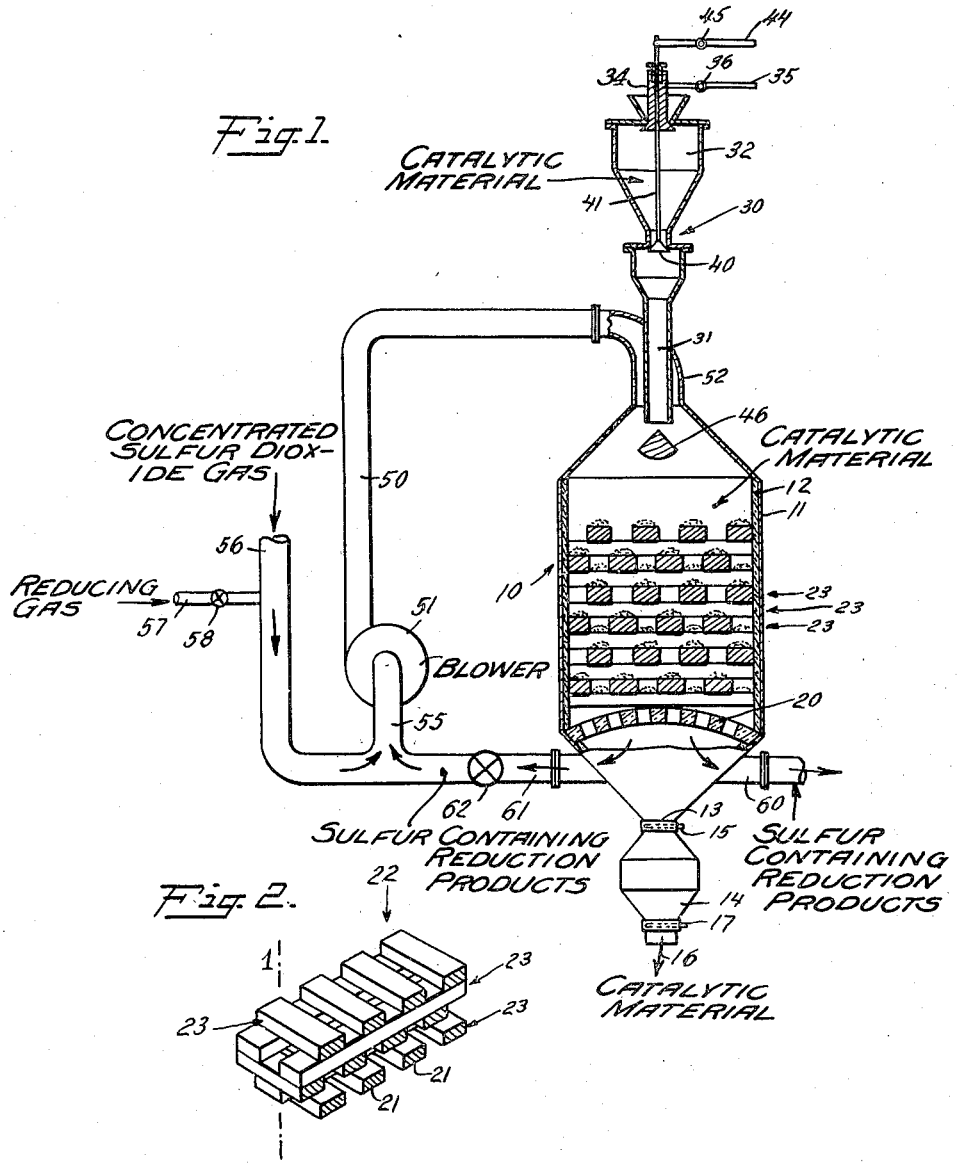
INVENTOR
Henry F. Merriam
BY
ATTORNEY Patented June 2, 1936

2,043,202

UNITED STATES PATENT OFFICE 2,043,202

METHOD FOR REDUCING SULPHUR DIOXIDE

Henry F. Merriam, West Orange, N. J., assignor to General Chemical Company, New York, N. Y., a corporation of New York Application July 23, 1932, Serial No. 624,180

12 Claims. (Cl. 23—226)

This invention relates generally to the reduction of sulphur dioxide to sulphur and/or hydrogen sulphide. The invention contemplates chiefly the reduction of sulphur dioxide to elemental sulphur and accordingly, for convenience, the invention is herein described in connection with the production of elemental sulphur, although it is to be understood that the principles of the present improvements apply to the formation of hydrogen sulphide if such end product is desired.

Broadly, the invention relates to a process for the production of elemental sulphur from sulphur dioxide or gas mixtures containing the same, irrespective of the source of the sulphur dioxide. In the more limited aspects, however, the invention is directed to the production of sulphur from relatively concentrated sulphur dioxide gas mixtures such as may be obtained, for example, by decomposition of sulphuric acid sludges comprising waste products of oil refining processes. The invention further contemplates particularly a method for the reduction of sulphur dioxide of comparatively concentrated sulphur dioxide gas mixtures by a method according to which the temperature of the reaction may be readily controlled so as to obtain a high degree of conversion.

It has heretofore been proposed to reduce sulphur dioxide to sulphur by passing a gas mixture containing reacting proportions of sulphur dioxide and reducing agent over catalysts such as bauxite. The reduction of sulphur dioxide to elemental sulphur by means of reducing agents takes place in an exothermic reaction in which relatively large quantities of heat are generated. In such reactions, when the temperature rises excessively, hydrogen sulphide tends to form, thus reducing the amount of sulphur recovered as such. Accordingly, when elemental sulphur is the desired end product, the reaction is preferably carried out at lower temperatures. In prior methods, the sulphur dioxide concentration of the gas stream has been comparatively low, and correspondingly small amounts of heat are evolved. Hence no particular difficulties arise in connection with proper control of the reaction. However, when operating with concentrated sulphur dioxide gas mixtures, large quantities of heat are evolved, and in order to recover maximum amounts of sulphur and reduce the formation of hydrogen sulphide to a minimum, adequate temperature control of the process is desirable. According to the present invention, such temperature control may be had by introducing into the gas mixture prior to reduction controlled amounts of inert gases as hereinafter specified.

One of the principal objects of the invention lies in the provision of a process by which elemental sulphur may be economically produced by reduction of the sulphur dioxide content of concentrated sulphur dioxide gas mixtures. A further object of the invention comprises the provision of a method whereby the temperature of the reduction reaction may be maintained within the desired optimum temperature limits by circulating controlled quantities of reaction products through the reaction zone.

Broadly considered, the method of the invention comprises controlling the temperature of a gas reaction, in which relatively large quantities of heat are generated, by withdrawing controlled portions of reaction products from the exit gas stream of the reaction zone, and introducing such portions into the reaction zone to maintain the temperature thereof within the desired limits. According to one preferred embodiment, sulphur dioxide and gaseous reducing agent are introduced into the reaction zone, and reacted in the presence of a catalyst, the reacted products being discharged from the reaction chamber. Suitably regulated quantities of hot reaction products are withdrawn from the exit gas of the reaction chamber, and introduced into the gas stream entering the converter. With this admixture of reacted products with the incoming gas stream, the fresh gases entering the system are heated to reactive temperature and sufficient quantities of reacted products are recycled through the reaction zone to prevent generation therein of excessive quantities of heat and to maintain the temperature in the reaction zone within the hereinafter noted preferred temperature range.

A further appreciation of the objects and advantages of the invention may be had from a consideration of the following description taken in connection with the accompanying drawing in which,—

Fig. 1 is an elevation, partly in section, of one form of apparatus in which the process constituting the invention may be carried out, and Fig. 2 is a perspective showing the arrangement of the baffles in the reaction chamber.

Referring to the drawing, the reference numeral 10 indicates a converter comprising preferably a cylindrical steel shell 11 having therein a firebrick lining 12. The lower end of the converter is funnel-shaped, and communicates through an opening 13 with an outlet chamber 14 adapted to receive catalytic material dropping out of the reaction zone in the converter. Passage of material through opening 13 is controlled by a slide valve 15. Catalytic material may be withdrawn from the chamber 14 through an outlet conduit 16, likewise controlled by a slide valve 17. It will be apparent that catalyst may be withdrawn from the converter without admitting air thereto.

At the lower end of the reaction chamber is a firebrick arch 20 supporting a plurality of baffles 21 constituting checkerwork indicated generally by the reference numeral 22. One feature of the converter construction comprises the arrangement of the checkerwork in the reaction chamber which effects intimate contact of the reactant gases, and reduces to a minimum, resistance to flow of the gas stream through the converter. Checkerwork 22 comprises a plurality of superposed layers or series 23, each series including a plurality of horizontally disposed, elongated baffles 21. The baffles 21, of each series 23, are preferably made of bauxite brick and are arranged parallel to each other and spaced apart a distance somewhat less than the width of an individual baffle 23. The baffles of each series contact with and are disposed preferably at right angles with respect to the baffles of immediately adjacent upper and lower series. As will be seen from an inspection of Fig. 2, the baffles of alternate series are parallel, but alternate series are offset horizontally so that there are no vertical channels of appreciable length in the checkerwork. Accordingly, the gas passages through the checkerwork are circuitous, and catalytic material on the baffles presents a large surface to the gas stream flowing through the converter.

Finely divided catalytic material may be fed into the upper end of the converter through a feed mechanism 30, terminating at the lower end in an inlet conduit 31 projecting into the reaction chamber. The charging chamber 32 of the feed mechanism is provided with an inlet valve 34 operated by a lever 35 pivoted at 36. Flow of material from the chamber 32 into the conduit 31 is controlled by a similar valve 40 on the lower end of a rod 41 passing axially through the valve 34, valve 40 being operated by a lever 44 pivoted at 45. Immediately beneath the lower end of the inlet conduit 31 is a cone 46 adapted to distribute the catalytic material evenly over the upper surface of the checkerwork 22.

Reacting gases are charged into the converter through a conduit 50 connected at one end to the outlet side of blower 51 and at the other end with an enlarged sleeve 52, surrounding inlet pipe 31, and opening into the reaction chamber. The inlet side of the blower is connected through pipes 55 and 56 with a source of gas supply. Reducing gases may be drawn into the pipe 56 through a connection 57 having therein a control valve 58.

Gaseous products of reaction are discharged from the converter through an outlet pipe 60 leading to suitable condensing apparatus. Any required quantities of product gases of the reaction may be withdrawn from the lower end of the converter, by the blower 51, through a conduit 61, controlled by valve 62, and opening at one end into the converter and at the other end into the pipe 55 on the inlet side of the blower.

Since the invention has particular application to the production of elemental sulphur from concentrated sulphur dioxide gas mixtures, the following illustrative example is given in connection with the recovery of sulphur from acid sludges.

Sulphuric acid sludges resulting from the refining of oils vary widely in composition, one representative sludge containing 45% sulphuric acid free or combined, 35% water, and 18% hydrocarbons. Although the invention is, of course, not dependent upon any particular method for the production of a concentrated sulphur dioxide gas mixture or process for the destructive distillation of acid sludge to produce a concentrated sulphur dioxide gas mixture, decomposition of the sludge may be advantageously effected by externally heating a charge of sludge, in a substantially airtight retort at relatively low temperatures, for example from 150–325° C. On heating, the sulphuric acid contained in the sludge is reduced by hydrogen of hydrocarbons and/or by the carbonaceous matter present in the sludge, and the gas mixture evolved contains sulphur dioxide and water as the major constituents, together with smaller quantities of hydrocarbon vapors, carbon dioxide, carbon monoxide and oxygen.

The exit gases from the acid sludge decomposition apparatus may be cooled to, say, 40° C., and the bulk of the water and hydrocarbon vapors are condensed and separated from the gas stream. Since decomposition of the sludge is preferably effected substantially in the absence of air or other diluting gas, the retort gas mixture, after separation of water and condensable hydrocarbons, is rich in sulphur dioxide and may contain, for example, by weight 91% sulphur dioxide, 2% water and 7% carbon dioxide.

A gas mixture of such composition is drawn into the apparatus through inlet pipe 56 by blower 51. The valve 58 in pipe 57 is opened to permit admission to the system of reducing agent, for example, natural gas so as to provide in the resulting gas mixture an excess of reducing gases, for instance, the gas mixture in conduit 56, after admission of reducing gas, may contain approximately by volume 61% $SO_2$, 33% $CH_4$, 5% $CO_2$ and the balance water vapor.

A supply of catalytic material, such as bauxite fines is maintained in the chamber 32 of the feed mechanism. Before reacting gases are admitted to the converter, the valve 40 is opened to permit admission to the converter of sufficient catalytic material to form on the top of each of the baffles small mounds of loosely associated catalytic material, any excess falling through the openings in the arch 20 and into the funnel-shaped bottom of the shell. The gas mixture containing sulphur dioxide and reducing agent is charged into the upper end of the converter by blower 51 and passes downwardly through the checkerwork 22. Because of the particular arrangement of the baffles comprising the checkerwork, there are provided numerous relatively large unobstructed gas passages through the converter. At the same time, the baffling effect of the checkerwork is such as to cause repeated contacts of reacting gases with the large surfaces of catalytic material on the baffles. Because of relative rapid movement of the gas stream through the converter and the finely divided nature of the catalytic material, the latter may tend to drop gradually, though at a relatively low rate, through the reaction chamber, co-current with the flow of the gas stream. The catalytic material passing through arch 20 is collected in the lower end of the shell, and may be withdrawn from the apparatus, without permitting the admission of air to the converter, and returned to charging chamber 32 by any satisfactory mechanism. During operation, the inlet valve 40 may be operated from time to time as required to feed into the converter amounts of catalytic material corresponding to those withdrawn from discharge chamber 14. However, after operation is under way, but little replacement of catalytic material is required.

Reduction of the sulphur dioxide to elemental sulphur in the presence of a catalyst such as bauxite may be effected at elevated temperatures, generally above 425° C. When the operation of the present process is initiated, the incoming gases are pre-heated by any appropriate means, preferably to 425–475° C., and introduced at this temperature into the reaction chamber. The reduction reaction taking place in the converter is exothermic, and particularly where the concentration of sulphur dioxide is high, relatively large quantities of heat are generated. If the temperature is permitted to rise above, say, 650° C., large quantities of hydrogen sulphide tend to form. Hence, when it is desired to produce elemental sulphur, the temperature in the reaction chamber should preferably be so controlled as to avoid temperatures at the outlet end of the converter substantially in excess of about 650° C.

In accordance with the present method, temperature control of the reaction is effected preferably by withdrawing regulated quantities of reaction products from the lower end of the converter, and mixing the same with the incoming gas stream, thus diluting the latter with inert gases. For this purpose, valve 62 in the pipe 61 is opened to permit withdrawal by blower 51 from the converter of sufficient quantities of reacted gases to dilute the gas mixture passing through the pipe 50 into the converter to such extent as to avoid excessive temperatures in the converter. Since in the present example, the concentrated sulphur dioxide gas mixture entering the inlet pipe 56 is at temperatures of about 40° C., the admixture of hot products from the converter with the incoming gas stream serves a twofold purpose, and in addition to diluting the incoming gas stream to the desired degree, preheats the same so that the temperature of the gas mixture entering the upper end of the converter is about 425–475° C.

It will be understood of course, that the quantity of reacted gases withdrawn from the converter through pipe connection 61, admixed with the incoming gas stream and recycled through the converter is dependent upon the particular operating conditions arising. For example, where the gas in conduit 56, after admission of reducing gas through inlet 57, is constituted as above noted, the admixture with such incoming gas of about four to five volumes of reaction product gases will generally be found sufficient to preheat the fresh incoming gas to reactive temperatures and at the same time provide for adequate temperature control in the reaction chamber. Where such quantities of products from the converter are introduced into the incoming gases, the resulting gas mixture in pipe 50 may contain for example by volume 15.0% $SO_2$, 9.0% $CH_4$, 22.0% $CO_2$, 3.0% $H_2S$, 16.0% $S_2$, and 35.0% water vapor. It will be understood that if the temperature of the product gases leaving the reaction chamber through the outlet pipe 60 should rise or fall above or below the optimum amount, it is only necessary to adjust the valve 62 so as to permit recycling of larger or smaller quantities of reacted gases through the converter as conditions may require.

The gaseous products of the reaction, discharged from the apparatus through the outlet pipe 60, and containing for example by volume 26.0% $CO_2$, 3.5% $SO_2$, 3.5% $H_2S$, 20.0% $S_2$, 2.3% $CH_4$ and 44.7% $H_2O$, are passed through any suitable cooler or condenser to effect condensation of sulphur vapor and recovery of sulphur. Where the gases leaving the condenser contain appreciable quantities of sulphur dioxide and hydrogen sulphide, the tail gases of the condenser may, after adjustment of the gas mixture to provide therein reacting proportions of sulphur dioxide and hydrogen sulphide, be passed through a second body of catalyst, such as bauxite, to recover the sulphur.

From the foregoing it will be seen that the present invention provides a process whereby the sulphur dioxide content of relatively concentrated sulphur dioxide gas mixtures can be economically reduced to elemental sulphur by reaction with reducing agent in the presence of a catalyst. The invention further provides for adequate temperature control by diluting the gas stream passing through the converter. By effecting this dilution of the gas stream with reaction products, operating advantages are obtained. The reaction products are largely inert with respect to the reaction taking place in the converter, and thus provide for adequate temperature control therein. The reaction products contain relatively large amounts of sulphur, and hence when recycled and utilized for temperature control do not effect reduction of the sulphur content of the products discharged from the apparatus through pipe 60, as would be the case in the event that gases other than the reduction products were employed as diluting medium. A high sulphur content in the fully converted gases makes ultimate recovery of sulphur more simple and economical because of the smaller volume of gas to handle.

Because of the particular arrangement of the packing in the latter, dilution of a concentrated gas mixture is made possible, and large volumes of reacting gases may be passed through the converter and intimately contacted therein with large surfaces of catalytic material without causing undue resistance to gas flow through the converter.

A further advantage of the present method arises from the fact that finely divided catalytic material may be economically utilized, thus avoiding expensive preparation of specially formed catalysts. Additionally, by employing baffles of bauxite brick, as in the present method, the bricks have a pronounced catalytic effect on the reaction when the temperatures thereof are in the upper portion of the preferred temperature range, say, at temperatures above about 550° C. The present process is not limited, however, to any particular method of forming the catalytic body in the converter, nor to the use of bauxite, since other finely divided catalysts such as iron oxide, pyrites cinder, tantalum oxide, aluminum oxide, and others may be employed.

It is also to be noted that the method for temperature control of the invention is not restricted to reducing reactions such as the reduction of sulphur dioxide to produce elemental sulphur and/or hydrogen sulphide. The process may be employed for controlling the temperature of other catalytic reactions, for example, oxidation of sulphur dioxide to sulphur trioxide. In such operation, the baffles of bauxite or other suitable refractory material may be impregnated with a suitable catalyst such as vanadium or platinum, and if desired further reaction may be brought about by the use of platinum, vanadium or other catalyst in finely divided form, charged into the converter as already described in connection with the preferred embodiment of the invention.

In situations where operations are such that the gas stream, after admixture of reducing gases at inlet 57, may already be heated to approximately reactive temperatures, no further preheating of the gas stream is required, and the hot reaction products, which are to be recycled through the converter to control the temperature therein, may be cooled as required by means of a cooler, not shown, and then admitted directly into the converter. Further, reducing agents other than natural gas may be employed, and may be introduced into the converter without previous admixture with the incoming sulphur dioxide gas stream.

In the foregoing description and in the subtended claims, the term "finely divided" is intended to include granular material of any convenient size not too large to interfere with free passage of such material through the checkerwork.

I claim:

1. In the process for the reduction of sulphur dioxide involving the reaction of sulphur dioxide and reducing agent at elevated temperatures, the improvement which comprises controlling the temperature of the reaction by introducing into the reaction zone at least a portion of the reaction mixture produced in the reaction zone.

2. In the process for the reduction of sulphur dioxide involving the reaction of sulphur dioxide and reducing agent at elevated temperatures, the improvement which comprises controlling the temperature of the reaction by introducing controlled amounts of relatively inert materials comprising elemental sulphur into the gas stream entering the reaction zone.

3. The process of reducing sulphur dioxide which comprises reacting sulphur dioxide and reducing agent in the presence of a catalyst, and controlling the temperature of the reaction by introducing into the reaction zone at least a portion of the reaction mixture produced in the reaction zone.

4. The process of reducing sulphur dioxide which comprises introducing sulphur dioxide into a reaction zone, reacting the sulphur dioxide therein with a reducing agent in the presence of a catalyst, and controlling the temperature of the reaction by introducing into the gas stream entering the reaction zone at least a portion of the reaction mixture produced in the reaction zone.

5. The process of reducing sulphur dioxide which comprises introducing sulphur dioxide into a reaction zone, reacting sulphur dioxide therein with reducing agent in the presence of a catalyst, and maintaining the temperature of the reaction within the desired range by introducing into the gas stream entering the reaction zone variable amounts of the reaction mixture produced in the reaction zone.

6. In the process for the reduction of sulphur dioxide involving the reaction of sulphur dioxide and reducing agent at elevated temperatures in the presence of a catalyst, the improvement which comprises heating sulphur dioxide entering the reaction zone to a temperature of not less than about 425° C. and maintaining the temperature in the reaction zone not substantially in excess of about 650° C. by introducing hot reaction products into the sulphur dioxide gas stream entering the reaction zone.

7. The method of recovering sulphur values of sulphuric acid sludge which comprises decomposing the sludge to produce sulphur dioxide, forming a gas mixture rich in sulphur dioxide, introducing the gas mixture into a reaction zone, reacting sulphur dioxide therein with reducing agent in the presence of a catalyst, controlling the temperature of the reaction by introducing a portion of the reaction products into the reaction zone, and recovering sulphur values from the remaining portion of reaction products.

8. The method of recovering sulphur values of sulphuric acid sludge which comprises decomposing acid sludge to produce gas containing sulphur dioxide, cooling the gas to form a gas mixture relatively rich in sulphur dioxide, introducing the gas mixture into a reaction zone, reducing sulphur dioxide therein by reacting the sulphur dioxide and reducing agent in the presence of a catalyst, heating the gas stream entering the reaction zone and controlling the temperature therein by introducing into the gas stream variable portions of reaction products, and recovering sulphur values from other portions of reaction products.

9. The method of recovering sulphur values of sulphuric acid sludge which comprises decomposing acid sludge to produce gas containing sulphur dioxide, cooling the gas to form a gas mixture relatively rich in sulphur dioxide, introducing the gas mixture into a reaction zone, reducing sulphur dioxide therein by reacting the sulphur dioxide and reducing agent in the presence of a catalyst, heating the gas stream entering the reaction zone to approximately 425° C. and maintaining the temperature of the reaction not substantially in excess of about 650° C. by introducing into the gas stream controlled portions of reaction products, and recovering sulphur values from other portions of reaction products.

10. In the process for the reduction of sulphur dioxide involving reaction of sulphur dioxide and reducing agent at elevated temperatures to produce reaction products comprising elemental sulphur, the improvement which comprises controlling the temperature of the reaction by introducing into the reaction zone at least a portion of reaction products comprising elemental sulphur.

11. In the process for the reduction of sulphur dioxide involving the reaction of sulphur dioxide and reducing agent at elevated reactive temperatures, the improvement comprising heating sulphur dioxide entering the reaction zone to initial reactive temperature and maintaining the temperatures of the reaction zone within the desired range by introducing hot reaction products into the sulphur dioxide gas stream entering the reaction zone.

12. The process of reducing sulphur dioxide which comprises introducing sulphur dioxide into a reaction zone, reacting sulphur dioxide therein with reducing agent, and maintaining the temperature of the reaction within the desired range by introducing into the gas stream entering the reaction zone variable amounts of the reaction mixture produced in the reaction zone.

HENRY F. MERRIAM.